United States Patent [19]
Wallace et al.

[11] Patent Number: 5,523,878
[45] Date of Patent: Jun. 4, 1996

[54] SELF-ASSEMBLED MONOLAYER COATING FOR MICRO-MECHANICAL DEVICES

[75] Inventors: Robert M. Wallace, Dallas, Tex.;
Douglas A. Webb, Chandler, Ariz.;
Bruce E. Gnade, Dallas, Tex.

[73] Assignee: Texas Instruments Incorporated, Dallas, Tex.

[21] Appl. No.: 268,485

[22] Filed: Jun. 30, 1994

[51] Int. Cl.$^6$ ................................................. G02B 26/00
[52] U.S. Cl. ........................ 359/290; 359/291; 359/224; 359/298; 427/534
[58] Field of Search ............................ 359/224, 226, 359/230, 213, 290, 291, 292, 293, 295, 298, 846, 847; 427/534, 162

[56] References Cited

U.S. PATENT DOCUMENTS

| | | | |
|---|---|---|---|
| 5,331,454 | 7/1994 | Hornbeck | 359/224 |
| 5,411,769 | 5/1995 | Hornbeck | 427/534 |

OTHER PUBLICATIONS

Colin D. Bain and George M. Whitesides, "Molecular–Level Control over Surface Order in Self–Assembled Monolayer Films of Thiols on Gold", *Science*, vol. 240, 1 Apr. 1988, pp. 62–63.

Paul E. Laibinis, James J. Hickman, Mark S. Wrighton, George M. Whitesides, "Orthogonal Self–Assembled Monolayers: Alkanethiols on Gold and Alkane Carboxylic Acids on Alumina", *Science*, vol. 245, 25 Aug. 1989, pp. 845–847.

*Primary Examiner*—Loha Ben
*Attorney, Agent, or Firm*—Julie L. Reed; Richard L. Donaldson; Rene E. Grossman

[57] ABSTRACT

A method of forming of a monomolecular coating (19) for surfaces of contacting elements (11, 17) of micro-mechanical devices (10), specifically, devices that have moving elements that contact other elements and that tend to stick as a result of the contact. The method uses liquid deposition, with the device being placed in a solution that contains a precursor to the formation of the coating. The precursor is chosen based on coordination chemistry between the precursor and the surface to be coated.

8 Claims, 1 Drawing Sheet

U.S. Patent   Jun. 4, 1996   5,523,878
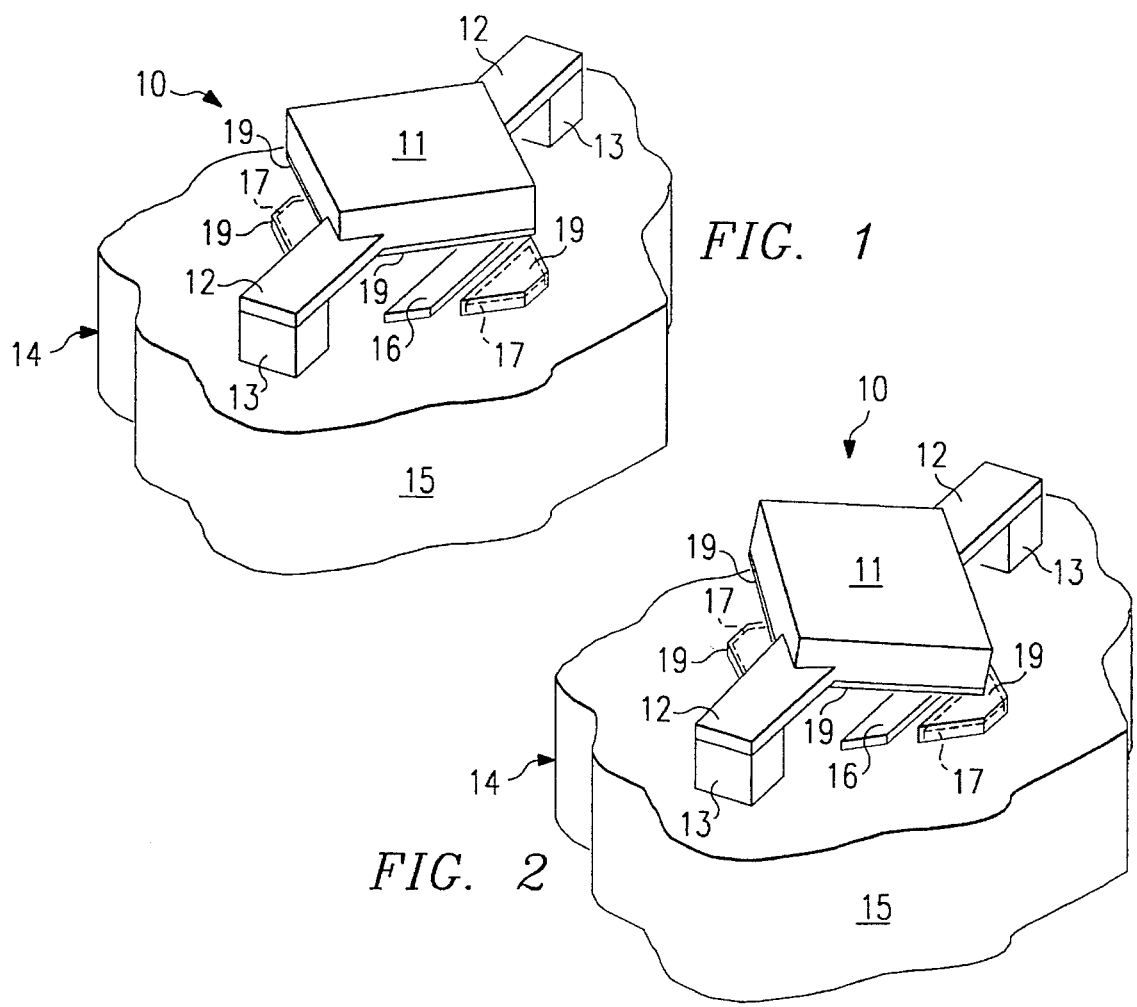
FIG. 1
FIG. 2
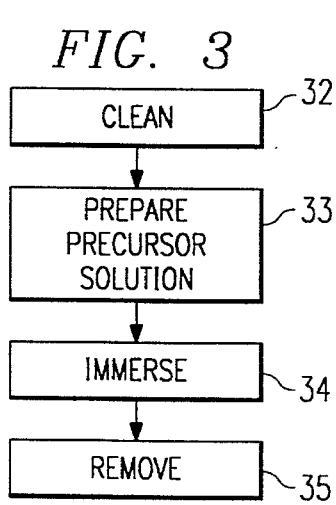
FIG. 3
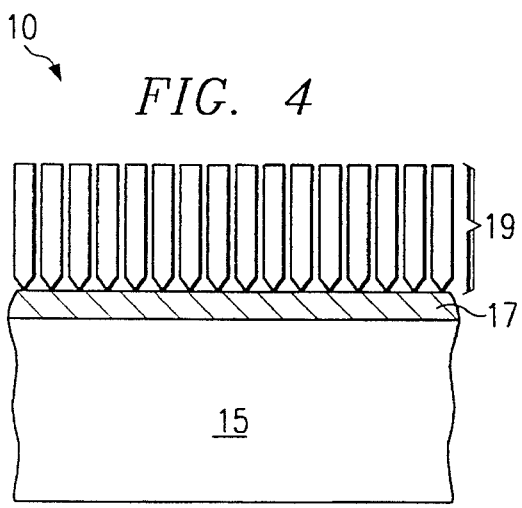
FIG. 4

SELF-ASSEMBLED MONOLAYER COATING FOR MICRO-MECHANICAL DEVICES

TECHNICAL FIELD OF THE INVENTION

This invention relates to micro-mechanical devices, and more particularly, to such devices having contacting elements and to a method for preventing sticking of these contacting elements.

BACKGROUND OF THE INVENTION

A recent development in the field of electro-mechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical reflective pixels.

One type of micro-mechanical spatial light modulator is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each is placed on one or more support posts and spaced by means of an air gap, over underlying control circuitry. The control circuitry provides electrostatic forces, which cause each mirror to selectively tilt. In many DMDs, an edge of the mirror contacts a landing electrode, which serves as a stop.

Reliability has been difficult to achieve with micro-mechanical devices. A common reliability problem is the sticking that may occur when moveable elements contact each other. If such elements stick together, the device ceases to operate properly.

Previous approaches to preventing sticking of contacting elements of micro-mechanical devices have been directed to coating the surfaces of the landing electrode and the mirror. The application of a layer of polymeric material is described in U.S. patent application Ser. No. 08/216,194, now U.S. Pat. No. 5,447,600, entitled "Polymeric Coatings for Micro-mechanical Devices". The application of a layer of perfluoropolyether material is described in U.S. patent application Ser. No. 08/239,497, entitled "PFPE Coatings for Micro-Mechanical Devices" (Atty Dkt No. TI-18478). It has also been discovered that a monomolecular layer (monolayer) may result in a reduction of friction between the contacting elements, thereby reducing the possibility of sticking. U.S. patent application Ser. No. 07/823,580, now U.S. Pat. No. 5,331,454, entitled "Low Reset Voltage Process for DMD", describes a method of providing a monolayer by means of vapor deposition. Each of these patent applications is assigned to Texas Instruments Incorporated.

SUMMARY OF THE INVENTION

One aspect of the invention is an improved micro-mechanical device of a type having relatively moving elements, portions of which may come into contact with each other and thereafter adhere together at their contacting surfaces. The improvement comprises a self-assembled monomolecular layer (monolayer) on at least one of the contacting surfaces. The monolayer is formed from a precursor solution that contains a precursor substance, selected on the basis of coordination chemistry with respect to the precursor and the surface to be coated. As an example of coordination chemistry, when the surface to be coated includes aluminum, suitable precursors are n-alkanoic acid, alkyl oxalic acid, hydroxamic acid, phosphonic acid, or sulfate. The precursor solution may also contain a solvent for decreasing the surface energy of the solution, with the added benefit that the solvent may be selected so as to remove unwanted residue. Finally, the precursor solution may contain a surfactant for decreasing surface tension of the solution.

An advantage of the invention is that it provides a coating that is thermally and chemically stable. The liquid deposition method is self-limiting in the sense that once the monolayer forms on the surface to be coated, the formation of the coating ceases even if the device is not removed from the liquid. The liquid deposition can be performed at temperatures that are lower than those used for vapor deposition, thereby avoiding damage that can occur when micro-mechanical structures are exposed to high temperatures. Finally, a solution containing the precursor for the monolayer can contain substances that perform cleaning as well as delivery of the precursor.

BRIEF DESCRIPTION OF THE DRAWINGS

FIG. 1 illustrates an undeflected beam element of one type of micro-mechanical device, a digital micro-mirror device (DMD), made in accordance with the invention.

FIG. 2 illustrates the beam element of FIG. 1 in a deflected position,

FIG. 3 illustrates the steps of the method of the invention.

FIG. 4 illustrates the monolayer of FIGS. 1 and 2.

DETAILED DESCRIPTION OF THE INVENTION

For purpose of example, the following description is in terms of a particular type of micro-mechanical device, a "digital micro-mirror device" (DMD), sometimes also referred to as a "deformable mirror device". As described in the Background, one application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective, and is sometimes referred to as a "beam". Also, in some applications, the DMD is not necessarily operated in a digital mode.

In general, the term "DMD" is used herein to include any type of micro-mechanical device having at least one deflecting beam element that is spaced with an air gap over a landing surface, which it contacts in response to an applied force. The invention is used during fabrication of the DMD to coat contacting surfaces of the beam elements and the surfaces upon which they land.

The invention is useful for other types of micro-mechanical devices that have moveable elements. Like the DMD's tilting beams, other micro-mechanical devices may have tiny rotors, levers, or other moving parts that come into contact with other surfaces during operation of the micro-mechanical device, thereby giving rise to the possibility of sticking.

FIGS. 1 and 2 illustrate a single mirror element 10 of a DMD. In this example, the beam is a reflective mirror 11. In FIG. 1, the mirror 11 is undeflected, whereas in FIG. 2, the mirror 11 is deflected by being tilted toward a landing electrode 17. As indicated above, various DMD applications may use such mirror elements 10 singly or in arrays.

The mirror element 10 of FIGS. 1 and 2 is known as a "torsion beam" element. Other types of mirror elements 10 can be fabricated, including cantilever beam types and flexure beam types. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. patent application Ser. No. 08/097,824. Each of these patents is assigned to Texas Instruments Incorporated and each is incorporated herein by reference.

In operation for image display applications, a light source illuminates the surface of the DMD. A lens system may be used to shape the light to approximately the size of the array of mirror elements 10 and to direct this light toward them. Each mirror element 10 has a tilting mirror 11 supported by torsion hinges 12 attached to support posts 13. These support posts 13 are formed on and extend away from the substrate 15. The mirrors 11 are positioned over a control circuit 14, which is comprised of address and memory circuitry fabricated on the substrate 15.

Voltages based on data in the memory cells of control circuit 14 are applied to two address electrodes 16, which are located under opposing corners of mirror 11. Electrostatic forces between the mirrors 11 and their address electrodes 16 are produced by selective application of voltages to the address electrodes 16. The electrostatic force causes each mirror 11 to tilt either about +10 degrees (on) or about −10 degrees (off), thereby modulating the light incident on the surface of the DMD. Light reflected from the "on" mirrors 11 is directed to an image plane, via display optics. Light from the "off" mirrors is reflected away from the image plane. The resulting pattern forms an image. The proportion of time during each image frame that a mirror 11 is "on" determines shades of grey. Color can be added by means of a color wheel or by a three-DMD setup.

In effect, the mirror 11 and its address electrodes 16 form capacitors. When appropriate voltages are applied to mirror 11 and its address electrodes 16, a resulting electrostatic force (attracting or repelling) causes the mirror 11 to tilt toward the attracting address electrode 16 or away from the repelling address electrode 16. The mirror 11 tilts until its edge contacts an underlying landing electrode 17.

Once the electrostatic force between the address electrodes 16 and the mirror 11 is removed, the energy stored in the hinge 12 provides a restoring force to return the mirror 11 to an undeflected position. Appropriate voltages may be applied to the mirror 11 or address electrodes 16 to aid in returning the mirror 11 to its undeflected position.

As indicated in FIGS. 1 and 2, mirror element 10 has a layer 19 on its exposed surfaces, which include the top surface of landing electrode 17 and the under surface of mirror 11. This layer 19 is referred to herein as a "monomolecular layer" (monolayer), defined as a film that has a thickness approximately equal to the length of the molecules that constitute the layer. Although monolayer 19 is shown only on surfaces of electrode 17 and mirror 11, as explained below, the deposition process is not necessarily selective and monolayer 19 may also form on other exposed surfaces, depending on the amenability of those surfaces to the formation of monolayer 19.

FIG. 3 illustrates the method aspects of the invention, used to form monolayer 19. For purposes of example, the method of the invention is described in terms of fabricating a single mirror element 10 of a DMD of the type described above. Typically, the method will be performed during fabrication of a DMD having an array of mirror elements 10, or during fabrication of any other micro-mechanical device having at least one moveable element.

The method of FIG. 3 assumes that the contacting elements of the DMD or other micro-mechanical device have been substantially fabricated. Thus, in the case of mirror element 10, electrodes 17 and mirror 11 have been fabricated prior to the method of FIG. 3.

In step 32, the DMD 10 is cleaned to remove contaminants. Step 32 may entail conventional cleaning techniques, using dry processing or solution-based processing.

In step 33, a solution is prepared, which contains the molecular precursor species for the formation of layer 19. This solution is to be used for a liquid deposition of the precursor, which results in self-assembled monolayer 19. The solution is referred to herein as the "precursor solution".

The choice of the precursor is based on a coordination chemistry with respect to the precursor and the surfaces to be coated. U.S. patent application Ser. No. 08/268,901, entitled "Monolayer Coating Using Molecular Recognition for Micro-Mechanical Devices" (Atty Dkt No. TI-17982), assigned to Texas Instruments Incorporated and incorporated by reference herein, describes examples of such chemistry when the surfaces to be coated are aluminum oxide or noble metal. In the case of an aluminum oxide surface, as a result of previous processing, the surface does not necessarily form a pure oxide layer. For these "processed aluminum oxide" surfaces, suitable precursors are alkyl oxalic acids, hydroxamic acids, phosphonic acids, sulfates, amines, and alcohols. The surface, whether aluminum or other metal, may well include an oxide layer, either from exposure to the atmosphere or processing. The precursor species is chosen to react with this metal oxide. Noble metal surfaces, where oxides are ideally not present, involve other precursor species. In the case of gold surfaces, suitable precursors are those that bear sulfur, phosphorus, or arsenic.

For purposes of this description, designation of the above-mentioned precursors is meant to include any perhalogenated variants. For example, n-alkanoic acids and phosphonic acids could be perfluorinated for improved anti-adhesion and lubricative results.

In addition to the precursor, the precursor solution contains a solvent. Perfluorinated and non-perfluorinated solvents may be used. The former is for decreasing surface tension, the latter is for cleaning. More specifically, an advantage for using a perfluorinated solvent is that capillary forces, which may damage fragile micro-mechanical parts, are reduced due to the low surface tension of the solution. An example of such a solvent is a perfluorinated solvent, such as FLUORINERT, a product available from 3M Corporation. Other non-fluorinated solvents may also be used for self-assembly, such as toluene. An advantage of using such solvents is that it may be helpful in removing undesired residue from previous fabrication steps, such as photoresist residue in the case of a DMD. When the surfaces to be coated are processed aluminum oxide, a suitable solution may comprise perfluorinated n-alkanoic acid in a concentration in the order of one millimolar.

The precursor solution may also include a surfactant for decreasing the surface tension of the precursor solution. An example of such a surfactant is PF5052, a product available from 3M Corporation.

Another consideration for the choice of a satisfactory precursor solution is that it must avoid crystallization or aggregation of the precursor molecules. Perfluorinated solvents have been determined to satisfy this requirement.

Step 34 is a liquid deposition step, in which the surfaces to be coated are immersed in the precursor solution. Typically, the deposition is performed by immersing the entire device in the solution. However, any method that immerses at least the surfaces to be coated is suitable. As indicated above in connection with FIGS. 1 and 2, the liquid deposition need not be spatially selective. The formation of the monolayer 19 on surfaces other than that of electrode 17 and mirror 11 is not likely to affect the operation of the typical micro-mechanical device.

The device remains in the precursor solution for a time sufficient to allow the formation of self-assembled monolayer 19. The required time can be determined experimentally, and depends on the materials involved. In general, the device is left in the precursor solution for at least a period of time sufficient to permit saturation of the surfaces to be coated. If the precursor solution has been prepared so that it has low surface tension, fragile micro-mechanical elements are not damaged by extended immersion.

A feature of the invention is that the liquid deposition that results in monolayer 19 is performed at temperatures that are significantly lower than those used for vapor phase deposition of other coatings. This reduces the potential of damage to the device.

Removal of the micro-mechanical device from the precursor solution, step 35, may have to be done slowly to minimize damage to the fragile micro-mechanical parts. Methods for separating the device from similar solutions are described in U.S. patent application Ser. No. 08/263,292, now U.S. Pat. No. 5,482,564, entitled "Method of Unsticking Components of Micromechanical Devices" (Atty Dkt No. TI-18705), assigned to Texas Instruments Incorporated and incorporated herein by reference.

Experimentation may show that monolayer 19 may be self-assembled by techniques other than immersion. For example, nebulizing the precursor solution and subjecting the surfaces to be coated to the resulting droplets may permit the same self-assembly as immersion.

The result of step 34 is the spontaneous formation of monolayer 19. Because of the coordination chemistry between the precursor and the surfaces to be coated, chemical bond formation occurs and anchors the precursor molecules to these surfaces. The molecules of the precursor solution attempt to occupy every available binding site on the surfaces to which the solution is exposed.

FIG. 4 illustrates the molecular structure of a self-assembled monolayer 19 on a surface of a micro-mechanical device. For purpose of example, the surface illustrated is electrode 17, such as discussed above in connection with FIGS. 1 and 2, which is fabricated on a substrate 15. The chemically active functional groups of the precursor molecules 40 are bound to the surface of the electrode 17. The precursor molecules 40 align themselves due to van der Waals interactions. The head groups of the molecules 40 are bound to the surface of electrode 17.

The reaction of the surface of electrode 17 with the precursor precludes the surface from reacting with moisture or other contaminants that may be present in the ambient environment.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An improved micro-mechanical device of a type having relatively moving elements, portions of which may come into contact with each other and thereafter adhere together at their contacting surfaces, wherein the improvement comprises:

a self-assembled monomolecular layer on at least one of said contacting surfaces, said layer having been formed from a precursor solution that contains a precursor substance;

wherein said contacting surfaces are comprised of a material selected from the group consisting of metal and aluminum oxide; and wherein said precursor solution contains a precursor substance selected from the group consisting of: hydrocarbon, fluorocarbon, n-alkanoic acid, alkyl oxalic acid, hydroxamic acid, and phosphonic acid.

2. The device of claim 1, wherein said precursor substance is selected on the basis of coordination chemistry between said precursor and the surface to be coated.

3. The device of claim 1, wherein said precursor solution further contains a solvent.

4. The device of claim 1, wherein said precursor solution further contains a surfactant for decreasing the surface tension of said solution.

5. A method of preventing sticking of contacting elements of a micro-mechanical device, comprising the steps of:

at least partially fabricating said micro-mechanical device, such that at least one of said contacting elements is substantially fabricated from materials selected from the group consisting of metal and aluminum oxide;

immersing at least the surface of said at least one contacting element in a precursor solution containing a precursor substance, such that molecules of said precursor substance bind to said surface as a self-assembled monolayer;

wherein said precursor solution contains a precursor substance selected from the group consisting of: hydrocarbon, fluorocarbon, n-alkanoic acid, alkyl oxalic acid, and hydroxamic acid.

6. The method of claim 5, wherein said precursor solution further contains a solvent.

7. The method of claim 5, wherein said precursor solution further contains a surfactant for decreasing the surface tension of said solution.

8. A digital micro-mirror device, comprising:

a substrate upon which the following elements are fabricated: at least one landing electrode, a support post, a hinge extending from said support post, a mass attached to said hinge, wherein said hinge is deformable so as to permit said mass to contact said landing electrode upon being subjected to an applied force; and wherein the contacting surface of said mass or of said landing electrode, or both of said contacting surfaces, are coated with a self-assembled monomolecular layer; and wherein said self-assembled monomolecular layer is made from an n-alkanoic precursor.

\* \* \* \* \*